United States Patent
Minami et al.

(10) Patent No.: US 7,667,721 B2
(45) Date of Patent: Feb. 23, 2010

(54) GRAY-SCALE IMPROVEMENT CIRCUIT AND DISPLAY SYSTEM

(75) Inventors: Koji Minami, Tokyo (JP); Chihiro Sakuwa, Tokyo (JP); Toshihiro Gai, Tokyo (JP); Masako Asamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 693 days.

(21) Appl. No.: 11/587,695

(22) PCT Filed: Feb. 16, 2005

(86) PCT No.: PCT/JP2005/002285

§ 371 (c)(1),
(2), (4) Date: Oct. 26, 2006

(87) PCT Pub. No.: WO2005/107238

PCT Pub. Date: Nov. 10, 2005

(65) Prior Publication Data

US 2008/0062101 A1 Mar. 13, 2008

(30) Foreign Application Priority Data

Apr. 28, 2004 (JP) ............................... 2004-132842

(51) Int. Cl.
*G09G 5/10* (2006.01)
(52) U.S. Cl. ..................................................... 345/690
(58) Field of Classification Search .................. 345/690
See application file for complete search history.

(56) References Cited

U.S. PATENT DOCUMENTS

| 6,388,678 | B1 * | 5/2002 | Kasahara et al. ............. 345/690 |
| 2003/0011545 | A1 * | 1/2003 | Sagano et al. .................. 345/76 |
| 2004/0032982 | A1 * | 2/2004 | Nishizawa .................... 382/171 |

FOREIGN PATENT DOCUMENTS

| JP | 7-99619 A | 4/1995 |
| JP | 2000-69327 A | 3/2000 |
| JP | 2002-185817 A | 6/2002 |
| JP | 2002-320111 A | 10/2002 |
| JP | 2002-359754 A | 12/2002 |
| JP | 2003-219205 A | 7/2003 |
| JP | 2004-7076 A | 1/2004 |
| JP | 2004-7301 A | 1/2004 |
| JP | 2004-23522 A | 1/2004 |
| JP | 2004-32551 A | 1/2004 |

* cited by examiner

*Primary Examiner*—Richard Hjerpe
*Assistant Examiner*—Carolyn R Edwards
(74) *Attorney, Agent, or Firm*—Birch, Stewart, Kolasch & Birch, LLP

(57) ABSTRACT

A gray-scale conversion means (10) converts the gray scale of an input video signal (100) as necessary, and outputs the video signal with the converted gray scale. A statistical processing means (13) detects a statistical property of each field or frame of the input video signal; a scene change detection means (16) detects scene changes in the input video signal. A conversion characteristic determination means (22) determines the gray-scale conversion characteristic according to outputs of the statistical processing means (13) and the scene change detection means (16). The gray-scale correction increases contrast regardless of image content, and enables faster response to changes in image content.

10 Claims, 10 Drawing Sheets

GRAY-SCALE IMPROVEMENT CIRCUIT AND DISPLAY SYSTEM

FIELD OF THE INVENTION

The present invention relates to a gray-scale improvement circuit. The present invention also relates to a display system having a gray-scale improvement circuit and a display means such as a liquid crystal display.

BACKGROUND ART

In order to enable high contrast video images to be reproduced regardless of image content, known gray-scale correction circuits divide the screen into a plurality of areas, calculate the mean value of the luminance signal in each area, create a luminance histogram of the mean luminance values in the areas, and control the input-output characteristic of a gray-scale correction means according to the luminance histogram (e.g., Patent Document 1). Patent Document 1: Japanese Patent Application Publication No. 2004-023522 (paragraph 0011, FIGS. 1 and 2)

DISCLOSURE OF THE INVENTION

Problems to be Solved by the Invention

When the input-output characteristic of a gray-scale correction means is controlled according to a luminance histogram created from the mean luminance values in the areas as described above, as the image content changes, the input-output characteristic of the gray-scale correction means is changed frequently, sometimes causing the screen to flicker between dark and bright. If the changes in the input-output characteristic of the gray-scale correction means are restricted, however, there is a problem of slow response to changes in image content.

An object of the present invention is to increase contrast regardless of image content, and speed up response to changes in the image content.

Means of Solution of the Problems

The present invention provides
a gray-scale improvement circuit comprising:
a gray-scale conversion means for receiving an input video signal, converting its gray scale as necessary, and outputting the video signal with the converted gray scale;
a statistical processing means for detecting a statistical property of each field or each frame of the input video signal;
a scene change detection means for detecting scene changes in the input video signal; and
a conversion characteristic determination means for determining a gray-scale conversion characteristic from outputs of the statistical processing means and the scene change detection means;
wherein the gray-scale conversion means converts the gray scale by using the gray-scale conversion characteristic determined by the conversion characteristic determination means.

EFFECT OF THE INVENTION

The present invention increases contrast regardless of image content, and enables faster response to changes in image content.

EXPLANATION OF REFERENCE CHARACTERS

10 gray-scale conversion means, 11 first gray-scale converter, 12 second gray-scale converter, 13 statistical processing means, 14 first target conversion characteristic setter, 15 second target conversion characteristic setter, 16 scene change detection means, 17 first applied conversion characteristic determiner, 18 second applied conversion characteristic determiner, 20 target conversion characteristic setting means, 22 applied conversion characteristic determination means, 24 conversion characteristic determination means, 31 gray-scale improvement circuit, 32 driving circuit, 33 display device, 34 display system, 100 input terminal, 200 output terminal, 300 input terminal.

BEST MODE OF PRACTICING THE INVENTION

Embodiments of the invention will now be described with reference to the attached drawings.

First Embodiment

Figure 1:
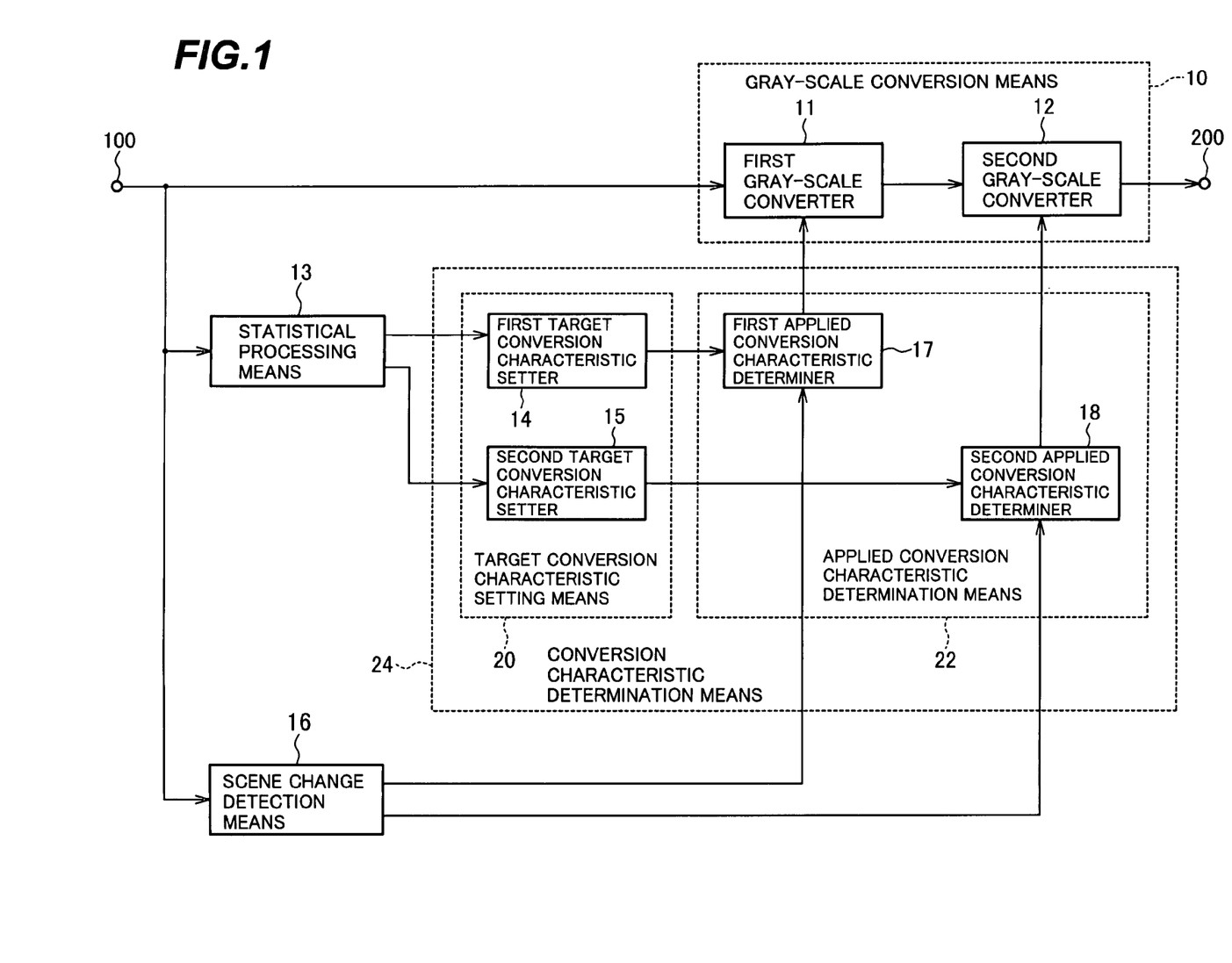
FIG. 1 is a block diagram illustrating a gray-scale improvement circuit in a first embodiment of the invention.

FIG. 1 shows a gray-scale improvement circuit according to a first embodiment of the present invention. The gray-scale improvement circuit shown in FIG. 1 receives an interlaced digital video signal as input, and outputs it with an improved gray scale. In the description below, the video signal is a monochrome signal.

As shown in the drawing, this gray-scale improvement circuit has a gray-scale conversion means 10 that receives an input video signal, alters its gray-scale characteristic as necessary, and outputs the video signal with the converted gray-scale characteristic. The gray-scale conversion means 10 comprises a first gray-scale converter 11 and a second gray-scale converter 12 connected in cascade.

The gray-scale improvement circuit in FIG. 1 further comprises a statistical processing means 13 that detects statistical properties of each field or each frame of the input video signal, a first target conversion characteristic setter 14 that determines a target conversion characteristic for the first gray-scale converter 11 from the output of the statistical processing means 13, a second target conversion characteristic setter 15 that likewise determines a target conversion characteristic for the second gray-scale converter 12 from the output of the statistical processing means 13, a scene change detection means 16 that detects scene changes in the input video signal, a first applied conversion characteristic determiner 17 that determines the conversion characteristic to be applied by the first gray-scale converter 11 from the output of the first target conversion characteristic setter 14 and the output of the scene change detection means 16, and a second applied conversion characteristic determiner 18 that determines the conversion characteristic to be applied by the second gray-scale converter 12 from the output of the second target conversion characteristic setter 15 and the output of the scene change detection means 16.

The first gray-scale converter 11 generates output by applying one of the five conversion characteristics (input-output characteristics) numbered 0-4 in FIG. 2; a signal output from the first applied conversion characteristic determiner 17 determines or specifies which of the conversion characteristics to use, as described later.

In conversion characteristic No. 0, the relationship between the input and the output is linear. In other words, the output OUT is related to the input IN as follows:

$$\text{OUT}=ka0 \cdot \text{IN} \quad (ka0 \text{ being a constant}) \quad (1)$$

Conversion characteristic No. 1 is a combination of two straight lines: when the input IN is less than a value IN11, the relationship of the output to the input IN is expressed as $$\text{OUT}=ks \cdot \text{IN} \quad (ks \text{ being a constant}) \quad (2)$$

and when the input IN is greater than the value IN11, the relationship of the output to the input IN is expressed as $$\text{OUT}=ka1 \cdot \text{IN}+kc1 \quad (ka1 \text{ and } kc1 \text{ being constants}) \quad (3)$$

(When the input IN is equal to the above value IN11, both equations (2) and (3) are satisfied.)

Conversion characteristic No. 2 is a combination of two straight lines: when the input IN is less than a value IN12, the relationship of the output to the input IN is expressed by equation (2) above; when the input IN is greater than the value IN12, the relationship of the output to the input IN is expressed as $$\text{OUT}=ka2 \cdot \text{IN}+kc2 \quad (ka2 \text{ and } kc2 \text{ being constants}) \quad (4)$$

(When the input IN is equal to the above value IN12, both equations (2) and (4) are satisfied.)

Conversion characteristic No. 3 is a combination of two straight lines: when the input IN is less than a value IN13, the relationship of the output to the input IN is expressed by equation (2) above; when the input IN is greater than the value IN13, the relationship of the output to the input IN is expressed as $$\text{OUT}=ka3 \cdot \text{IN}+kc3 \quad (ka3 \text{ and } kc3 \text{ being constants}) \quad (5)$$

(When the input IN is equal to the above value IN13, both equations (2) and (5) are satisfied.)

Conversion characteristic No. 4 is a combination of two straight lines: when the input IN is less than a value IN14, the relationship of the output to the input IN is expressed by equation (2) above; when the input IN is greater than the value IN14, the relationship of the output to the input IN is expressed as $$\text{OUT}=ka4 \cdot \text{IN}+kc4 \quad (ka4 \text{ and } kc4 \text{ being constants}) \quad (6)$$

(When the input IN is equal to the above value IN14, both equations (2) and (6) are satisfied.)

The constants are related as follows:

$$ks<ka0<ka1<ka2<ka3<ka4 \quad (7)$$

The constants ks, ka0 to ka4, and kc1 to kc4 are also selected so that when the input IN has its maximum value INmax, the output OUT will have its maximum value OUTmax. For eight-bit signals, the maximum INmax of the input IN and the maximum OUTmax of the output OUT are both $(2^8-1)=255$.

The plurality of conversion characteristics numbered 0 to 4 are characterized in that the higher the number is, the more intense a certain feature, namely the contrast in non-dark portions of the image, becomes. Therefore, for images having fewer dark portions, an image with heightened contrast and an improved gray-scale can be obtained by selecting conversion characteristics with higher numbers. The numbers in the drawing are also referred to as 'characteristic numbers' or 'conversion characteristic specification values' in this application.

IN11, IN12, IN13, IN14 are related, for example, as follows $$\text{IN14}-\text{IN13}=\text{IN13}-\text{IN12}=\text{IN12}-\text{IN11}=\text{IN11}$$

so that when the value of the characteristic number changes by one, in the associated gray-scale conversion characteristic, the strength of the above feature changes by a corresponding amount.

Figure 3:
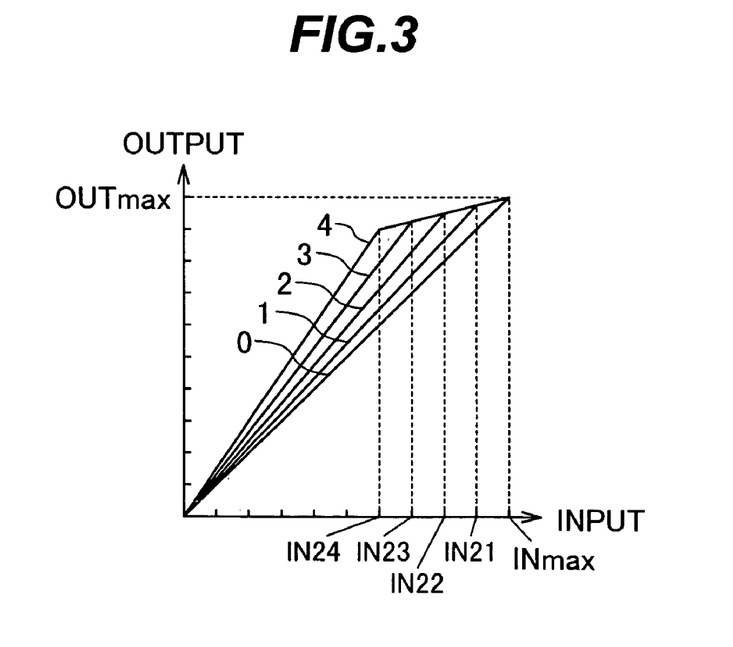
FIG. 3 is a graph showing conversion characteristics of the second gray-scale converter in the first embodiment of the invention.

The second gray-scale converter 12 generates output by applying one of the five conversion characteristics (input-output characteristics) numbered 0 to 4 in FIG. 3. A signal output from the second applied conversion characteristic determiner 18 determines or specifies which of the conversion characteristics to use, as will be described below.

In conversion characteristic No. 0, the relationship between the input and the output is linear. In other words, the output OUT is related to the input IN as follows:

$$\text{OUT}=kb0 \cdot \text{IN} \quad (kb0 \text{ being a constant}) \quad (8)$$

Conversion characteristic No. 1 is a combination of two straight lines: when the input IN is greater than a value IN1, the relationship of the output to the input IN is expressed as $$OUT=kg \cdot IN+kd \text{ (kg and kd being constants)} \quad (9)$$

and when the input IN is less than the value IN21, the relationship of the output to the input IN is expressed as $$OUT=kb1 \cdot IN \text{ (kb1 being a constant)} \quad (10)$$

(When the input IN is equal to the above value IN21, both equations (9) and (10) are satisfied.)

Conversion characteristic No. 2 is a combination of two straight lines: when the input IN is greater than a value IN22, the relationship of the output to the input IN is expressed by expression (9); when the input IN is less than the value IN22, the relationship of the output to the input IN is expressed as $$OUT=kb2 \cdot IN \text{ (kb being a constant)} \quad (11)$$

(When the input IN is equal to the above value IN22, both equations (9) and (11) are satisfied.)

Conversion characteristic No. 3 is a combination of two straight lines: when the input IN is greater than a value IN3, the relationship of the output to the input IN is expressed by expression (9); when the input IN is less than the value IN23, the relationship of the output to the input IN is expressed as $$OUT=kb3 \cdot IN \text{ (kb3 being a constant)} \quad (12)$$

(When the input IN is equal to the above value IN23, both equations (9) and (12) are satisfied.)

Conversion characteristic No. 4 is a combination of two straight lines: when the input IN is greater than a value IN24, the relationship of the output to the input IN is expressed by expression (9); when the input IN is less than the value IN24, the relationship of the output to the input IN is expressed as $$OUT=kb4 \cdot IN \text{ (kb4 being a constant)} \quad (13)$$

(When the input IN is equal to the above value IN24, both equations (9) and (13) are satisfied.)

The constants are related as follows:

$$kg<kb0<kb1<kb2<kb3<kb4 \quad (14)$$

The constants kg, kd, and kb0 to kb4 are also selected so that when the input IN has its maximum value INmax, the output OUT will have its maximum value OUTmax.

The plurality of conversion characteristics numbered 0 to 4 are characterized in that the higher the number is, the more intense a certain feature, namely the contrast in non-bright portions of the image, becomes. Therefore, for an image with fewer bright portions, an image with heightened contrast and an improved gray-scale can be obtained by selecting a conversion characteristic with a higher number. The numbers in the drawing are also referred to as the 'characteristic numbers' or 'conversion characteristic specification values' in this application.

IN21, IN22, IN23, IN24 are related, for example, as follows:

$$INmax-IN21=IN21-IN22=IN22-IN23=IN23-IN24$$

so that when the value of the characteristic number changes by one, in the associated gray-scale conversion characteristic, the strength of the above feature changes by a corresponding amount.

From the pixel values of the input video signal, the statistical processing means 13 calculates a histogram for each field interval, that is, for each field. Specifically, the statistical processing means 13 classifies the pixel values of the input video signal (signal levels) into ten classes (0 to 9), and calculates the proportion of the pixels in each field belonging to each class to determine the frequency of appearance of each class.

Figure 4:
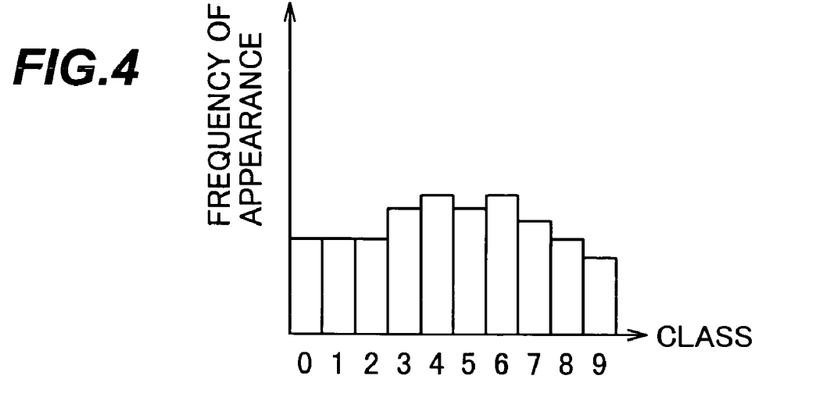
FIG. 4 is a graph showing an exemplary output result of the statistical processing means in the first embodiment of the invention.
Figure 5:
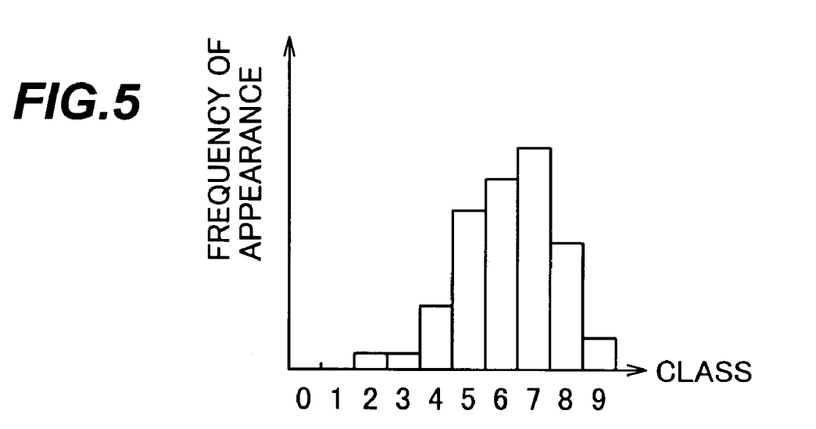
FIG. 5 is a graph showing another exemplary output result of the statistical processing means in the first embodiment of the invention.
Figure 6:
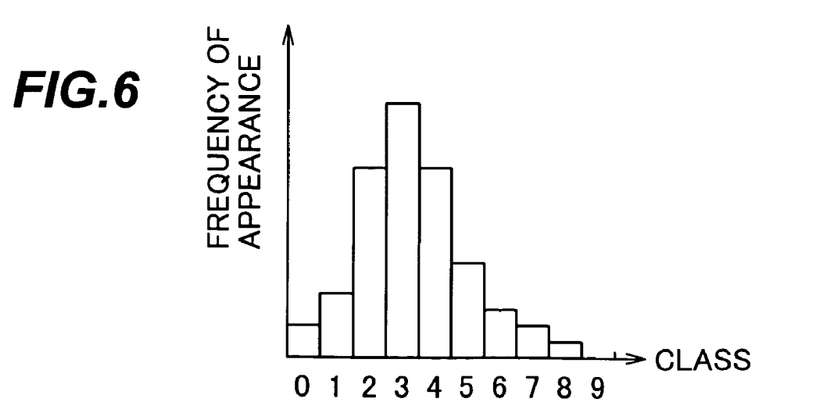
FIG. 6 is a graph showing another exemplary output result of the statistical processing means in the first embodiment of the invention.
Figure 7:
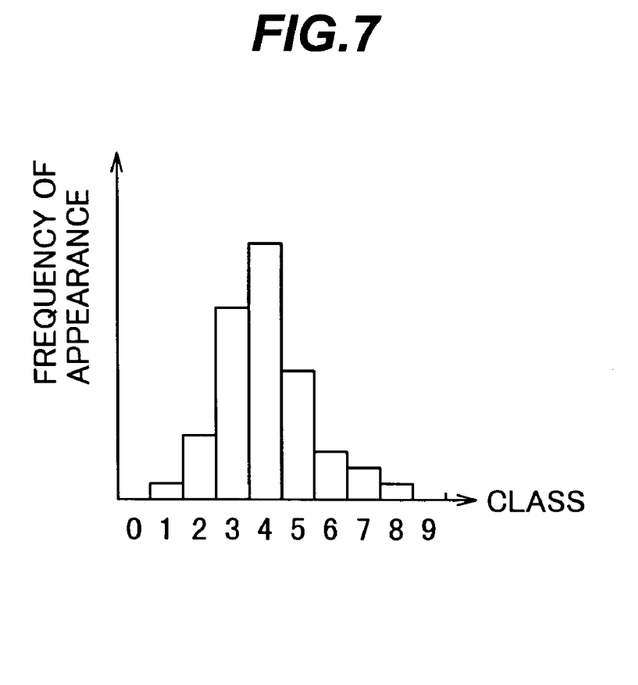
FIG. 7 is a graph showing another exemplary output result of the statistical processing means in the first embodiment of the invention.

For example, from an image in which the pixels are distributed evenly from bright to dark levels, a histogram in which there are no significant differences in the frequency of appearance of different classes is obtained as shown in FIG. 4. From a video signal having more bright pixels than dark pixels, a histogram in which the higher signal level classes have a higher frequency of appearance is obtained as shown in FIG. 5, and from a video signal having more dark pixels than bright pixels, a histogram in which the lower signal level classes have a higher frequency of appearance is obtained as shown in FIG. 6. From an image having mainly pixels of intermediate brightness, including few bright pixels and dark pixels, a histogram in which the middle signal level classes have the highest frequency of appearance is obtained as shown in FIG. 7.

The first target conversion characteristic setter 14 determines a class at which the cumulative frequency equals or exceeds a predetermined value, the cumulative frequency being calculated by accumulating the frequency of appearance of the classes from the class at the bottom of the gray scale (class 0) on up in ascending order (classes 1, 2, 3, . . . ), and sets a target conversion characteristic for the first gray-scale converter 11 according to the class thus determined. For example, the first target conversion characteristic setter 14 compares the output of the statistical processing means 13 with a predetermined value L and determines the target conversion characteristic specification value TC1 for the first gray-scale converter 11 from the result of the comparison. If the frequency of appearance is L1 for the lowest class (0), L2 for the second lowest class (1), L3 for the third lowest class (2), and L4 for the fourth lowest class (3), then if $L \leq L1$, then TC1=0, if $L1 < L \leq L1+L2$, then TC1=1, if $L1+L2 < L \leq L1+L2+L3$, then TC1=2, if $L1+L2+L3 < L \leq L1+L2+L3+L4$, then TC1=3, and if $L1+L2+L3+L4 < L$, then TC1=4.

Thus, the higher the frequency of appearance of the lower classes is, the smaller the value of TC1 will be.

The scene change detection means 16 compares the video signal of an input field or frame to the video signal of the preceding field or frame, and outputs a signal indicating the degree of the change in the video signal between the two fields or two frames as scene change information. For example, the scene change detection means 16 divides one screen into a plurality of areas, calculates the mean values of the pixels in the respective areas, and outputs the number of areas whose mean values differ by a predetermined value or more between fields as scene change information.

Figure 8:
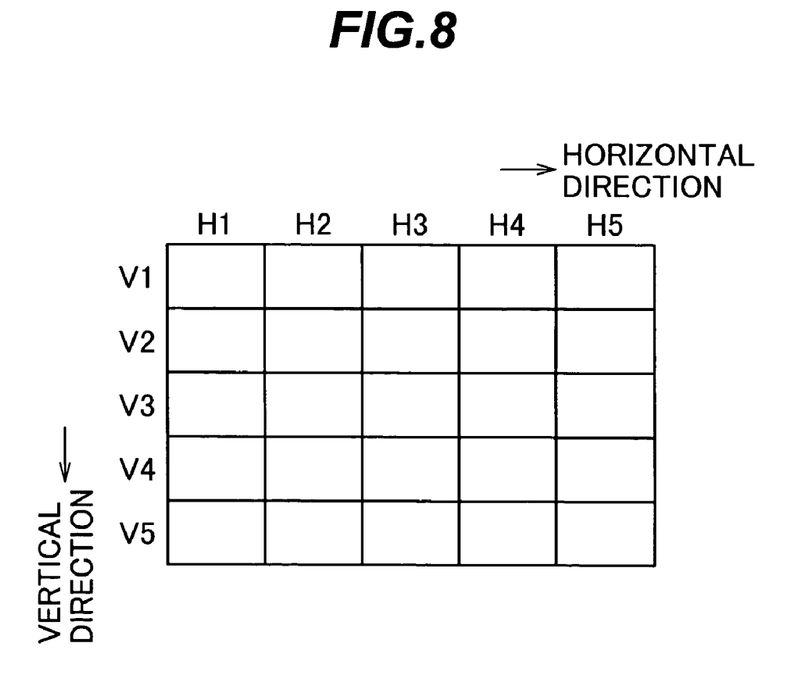
FIG. 8 shows an exemplary division of the screen by the scene change detection means in the first embodiment of the invention.

More specifically, one screen is partitioned into twenty-five areas (five parts horizontally and five parts vertically) as shown in FIG. 8; for each area in each field, the difference between the mean pixel value and the mean pixel value of the same area in the preceding field is calculated; the difference in mean values is compared with a predetermined value S; and a signal indicating the number of areas in which the mean value difference is equal to or greater than the predetermined value S is output as scene change information.

The first applied conversion characteristic determiner 17 determines and outputs the conversion characteristic specification value FC1(*t*) of the conversion characteristic to be applied according to the target conversion characteristic specification value TC1 obtained from the first target conversion characteristic setter 14. The first applied conversion characteristic determiner 17 retains the conversion characteristic specification value FC1(*t*−1) applied in the preceding field, however, and bases its determination of the conversion characteristic specification value FC1(*t*) applied to the current field on FC1(*t*−1).

More specifically, the change (difference in specification value) from the conversion characteristic specification value FC1(*t*−1) applied in the preceding field is restricted to within a predetermined limit and the conversion characteristics specification value FC1(*t*) to be applied in the current field is set as close to the target conversion characteristic specification value TC1 as possible within that limit. The value of the predetermined limit varies, however, depending on the output of the scene change detection means 16.

For example, the change is unrestricted when the output SC from the scene change detection means 16 is twenty or more, the change is restricted to ±2 when SC is ten or more but less than twenty, and the change is restricted to ±1 when SC is less than ten.

As a result, when the output SC of the scene change detection means 16 is twenty or more, the target conversion characteristic specification value TC1 is output as the applied conversion characteristic specification value FC1(*t*) without change. When the output of the scene change detection means 16 is ten or more and less than twenty, the change from the conversion characteristic specification value FC1(*t*−1) applied in the preceding field is limited to not more than ±2. When the output of the scene change detection means 16 is less than ten, the change from the conversion characteristic specification value FC1(*t*−1) applied in the preceding field is limited to not more than ±1. The value thus determined is output as the conversion characteristic specification value FC1(*t*) that applies in the current field.

Figure 2:
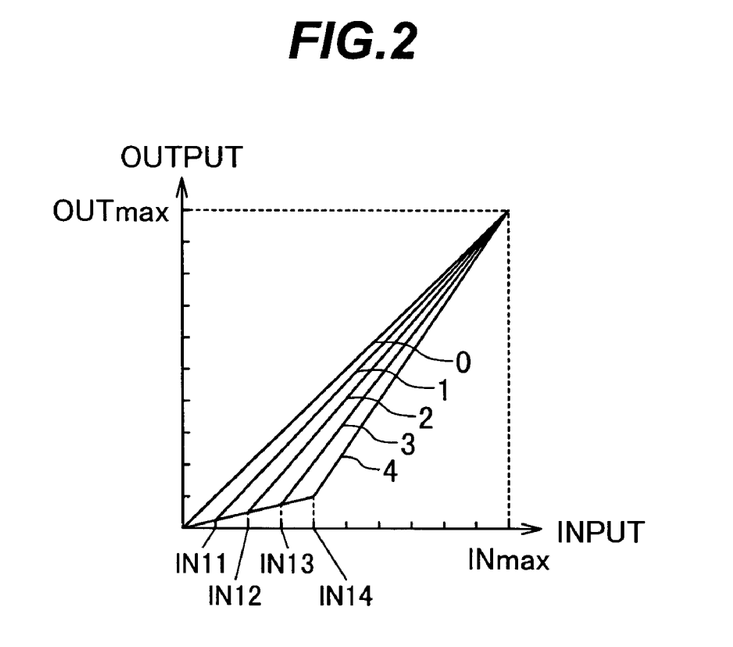
FIG. 2 is a graph showing conversion characteristics of the first gray-scale converter in the first embodiment of the invention.

The first gray-scale converter 11 selects one of the conversion characteristics shown in FIG. 2 depending on the given applied conversion characteristic specification value FC1(*t*). In the example shown, the conversion characteristic indicated by the number equal to the given applied conversion characteristic specification value FC1(*t*) is selected. That is, when the applied conversion specification value FC1(*t*) is 0, 1, 2, 3, or 4, the selected conversion characteristic is number 0, 1, 2, 3, or 4, respectively.

Altering the gray-scale characteristic as described above avoids flicker and avoids the loss of gray-level resolution near the black end of the scale.

The second target conversion characteristic setter 15 determines a class at which the cumulative frequency equals or exceeds a predetermined value, the cumulative frequency being calculated by accumulating the frequency of appearance of the classes from the class at the top of the gray scale (class 9) on down in descending order (classes 8, 7, 6, . . . ) and sets a target conversion characteristic for the second gray-scale converter 12 according to the class thus determined. For example, the second target conversion characteristic setter 15 compares the output of the statistical processing means 13 with a predetermined value H and determines the target conversion characteristic specification value TC2 of the second gray-scale converter 12 from the result of the comparison. If the frequency of appearance is H1 for the highest class (9), H2 for the second highest class (8), H3 for the third highest class (7) and H4 for the fourth highest class (6), then if $H \leq H1$, then TC2=0, if $H1 < H \leq H1+H2$, then TC2=1, if $H1+H2 < H \leq H1+H2+H3$, then TC2=2, if $H1+H2+H3 < H \leq H1+H2+H3+H4$, then TC2=3, and if $H1+H2+H3+H4 < H$, then TC2=4.

Thus, the higher the frequency of appearance of the higher classes is, the smaller the value of TC2 will be.

The second applied conversion characteristic determiner 18 determines and outputs the conversion characteristic specification value FC2(*t*) of the conversion characteristic to be applied according to the target conversion characteristic specification value TC2 obtained from the second target conversion characteristic setter 15. The second applied conversion characteristic determiner 18 retains the conversion characteristic specification value FC2(*t*−1) applied in the preceding field, however, and bases its determination of the conversion characteristic specification value FC2(*t*) applied to the current field on FC2(*t*−1).

More specifically, the change (difference in specification value) from the conversion characteristic specification value FC2(*t*−1) applied in the preceding field is restricted to within a predetermined limit and the conversion characteristics specification value FC2(*t*) to be applied in the current field is set as close to the target conversion characteristic specification value TC1 as possible within that limit. The value of the predetermined limit varies, however, depending on the output of the scene change detection means 16.

For example, the change is unrestricted when the output SC from the scene change detection means 16 is twenty or more, the change is restricted to ±2 when SC is ten or more but less than twenty, and the change is restricted to ±1 when SC is less than ten.

As a result, when the output SC of the scene change detection means 16 is twenty or more, the target conversion characteristic specification value TC2 is output as the applied conversion characteristic specification value FC2(*t*) without change. When the output of the scene change detection means 16 is ten or more and less than twenty, the change from the conversion characteristic specification value FC2(*t*−1) applied in the preceding field is limited to not more than ±2. When the output of the scene change detection means 16 is less than ten, the change from the conversion characteristic specification value FC2(*t*−1) applied in the preceding field is limited to not more than ±1. The value thus determined is output as the conversion characteristic specification value FC2(*t*) that applies in the current field.

The second gray-scale converter 12 selects one of the conversion characteristics shown in FIG. 3 depending on the given applied conversion characteristic specification value FC2(*t*). In the example shown, the conversion characteristic indicated by the number equal to the given applied conversion characteristic specification value FC2(*t*) is selected. That is, when the applied conversion specification value FC2(*t*) is 0, 1, 2, 3, or 4, the selected conversion characteristic is number 0, 1, 2, 3, or 4, respectively.

Altering the gray-scale characteristic as described above avoids flickering and avoids loss of gray-level resolution near the white end of the scale.

As described above, in the first embodiment, while the gray-scale characteristic is improved according to the content of the input video signal, a favorable improvement can be carried out without having flicker sensed when the gray scale is changed, and without loss of gray level resolution at the black or white end of the scale due to slow control response.

In the above embodiment, the first target conversion characteristic setter 14 and the second target conversion characteristic setter 15 constitute a target conversion characteristic setting means that sets target conversion characteristics for the gray-scale conversion means 10 based on the output from 13. The first applied conversion characteristic determiner 17 and the second applied conversion characteristic determiner 18 constitute an applied conversion characteristic determination means 22 that determines the conversion characteristic actually applied to the current field or frame from the target conversion characteristic set by the target conversion characteristic setting means 20, the output of the scene change detection means 16, and the conversion characteristic applied by the gray-scale conversion means 10 to the video signal in the preceding field or frame. The target conversion characteristic setting means 20 and applied conversion characteristic determination means 22 constitute a conversion characteristic determination means 24 that determines the conversion characteristic applied by the gray-scale conversion means 10 from the outputs of the statistical processing means 13 and scene change detection means 16.

Figure 9:
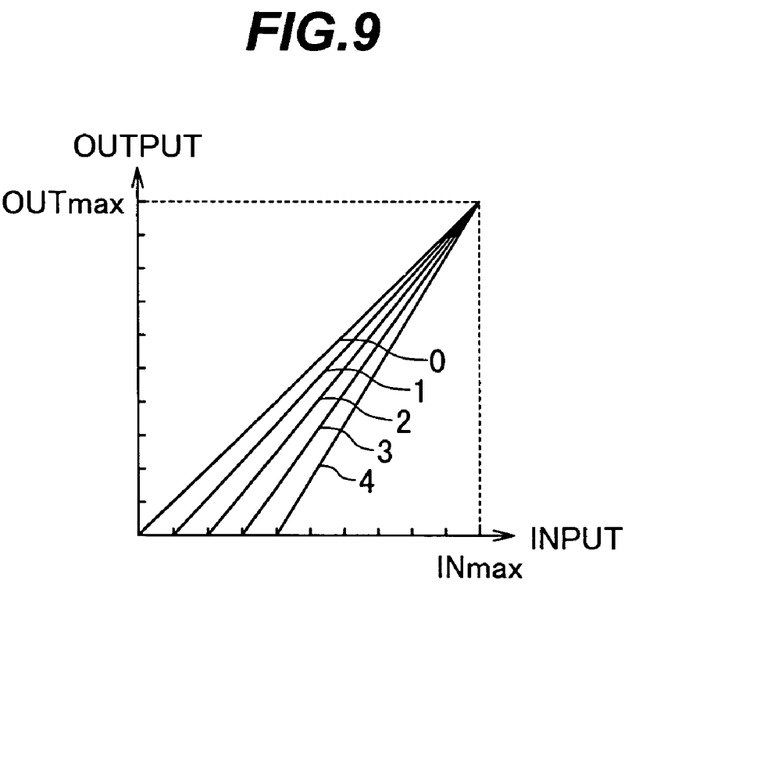
FIG. 9 is a graph showing conversion characteristics of the first gray-scale converter in the first embodiment of the invention.
Figure 10:
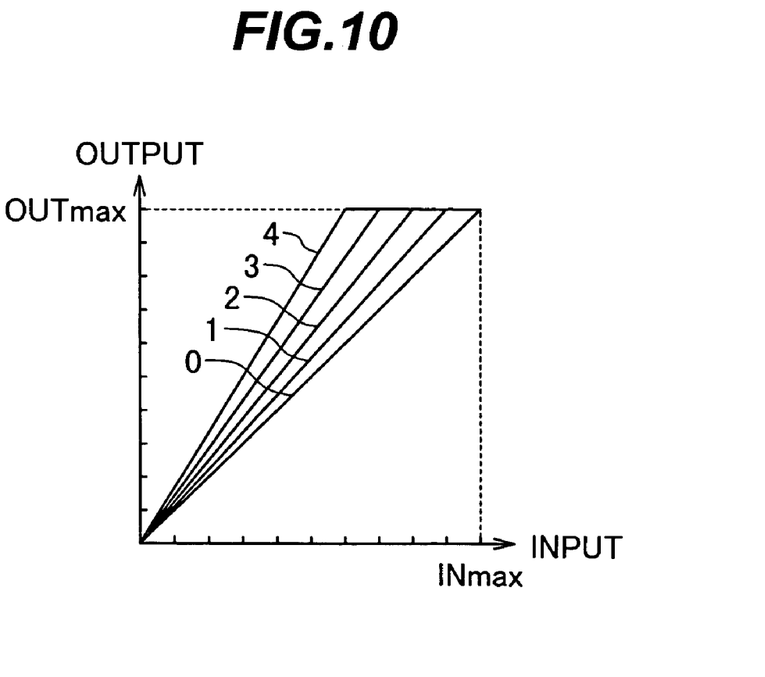
FIG. 10 is a graph showing conversion characteristics of the second gray-scale converter in the first embodiment of the invention.

In the first embodiment, the conversion characteristics of the first gray-scale converter 11 and second gray-scale converter 12 are as shown in FIGS. 2 and 3, respectively, but the conversion characteristics are not limited thereto; conversion characteristics like those shown in FIGS. 9 and 10 can be used instead. It will be appreciated that the characteristics shown in FIG. 9 correspond to the case where ks=0 in the characteristics in FIG. 2 and the characteristics shown in FIG. 10 correspond to the case where kg=0 and kd=OUTmax in the characteristics in FIG. 3.

In the first embodiment, the first gray-scale converter 11 and the second gray-scale converter 12 can select one of five conversion characteristics, but the number of conversion characteristic options is not limited to five; it may be more or less than five.

In the first embodiment, two gray-scale conversion means, two target conversion characteristic setting means, and two applied conversion characteristic determination means are provided in the gray-scale conversion means, but the invention is not limited to this configuration. To reduce the scale of the hardware, the gray-scale conversion means may have only one of each of these means, although the improvement effect is then reduced.

The exemplary statistical processing means 13 in the first embodiment calculates a histogram, but the target conversion characteristic specification value output by the first target conversion characteristic setter 14 may instead be found from the minimum value in the field, and the target conversion characteristic specification value output by the second target conversion characteristic setter 15 may be found from the maximum value in the field. Alternatively, the statistical processing means 13 may calculate the mean value of the field, and the target conversion characteristic specification value output by the first target conversion characteristic setter 14 may be found from the mean value. Less hardware is required to calculate the minimum, maximum, and mean values of a field than to calculate a histogram.

Next, an exemplary method of determining target conversion characteristic specification value TC1 from the minimum value will be described. As an example, one of the characteristics shown in FIG. 9 will be selected according to the minimum value. The value can be selected as follows. The minimum value will be denoted MIN. Predetermined values MIN1, MIN2, MIN3, MIN4, and MIN5 satisfying the following condition are used:

$$0 < MIN1 < MIN2 < MIN3 < MIN4 < MIN5$$

The value of TC1 is determined as follows:

if $0 \leq MIN < MIN1$, then TC1=0, if $MIN1 \leq MIN < MIN2$, then TC1=11, if $MIN2 \leq MIN < MIN3$, then TC1=2, if $MIN3 \leq MIN < MIN4$, then TC1=3, and if $MIN4 \leq MIN < MIN5$, then TC1=4.

An exemplary method of determining target conversion characteristic specification value TC2 from the maximum value will be described. The maximum value will be denoted MAX. Predetermined values MAX1, MAX2, MAX3, MAX4, and MAX5 satisfying the following condition are used:

$$INmax > MAX1 > MAX2 > MAX3 > MAX4 > MAX5$$

where INmax is the maximum value that the input video signal can take. When the input video signal is an eight-bit signal, INmax is 255. The value of TC2 is determined as follows:

if $MAX1 \leq MIN < INmax$, then TC2=0, if $MIN2 \leq MIN < MIN1$, then TC2=1, if $MIN3 \leq MIN < MIN2$, then TC2=2, if $MIN4 \leq MIN < MIN3$, then TC2=3, and if $MIN5 \leq MIN < MIN4$, then TC2=4.

An exemplary method of determining target conversion characteristic specification value TC1 from the mean value will now be described. The mean value will be denoted AVE. Predetermined values AVE0, AVE1, AVE2, AVE3, AVE4, and AVE5 satisfying the following condition are used:

$$AVE0 < AVE1 < AVE2 < AVE3 < AVE4 < AVE5.$$

The value of TC1 is determined as follows:

if $AVE0 \leq AVE < AVE1$, then TC1=0, if $AVE1 \leq AVE < AVE2$, then TC1=1, if $AVE2 \leq AVE < AVE3$, then TC1=2, if $AVE3 \leq AVE < AVE4$, then TC1=3, and if $AVE4 \leq AVE < AVE5$, then TC1=4.

In the embodiment above, the conversion characteristics correspond to characteristic numbers and are selected by specifying their characteristic numbers. However, the conversion characteristics may be alterable in a continuous fashion without steps. In this case, the conversion characteristic is altered by changing one of its parameters: for example, by changing a constant in the mathematical expression representing the conversion characteristic, or changing the range to which the expression applies. That is, one of the constants ks, ka1, ka0 to ka4, kc1 to kc4, kb0 to kb4, kg, and kd may be altered, or one of the values IN11 to IN14 and IN21 to IN24 that indicate the applicable range of the characteristic line given by the above expressions (1) to (6) and (8) to (13) may be altered.

In this case, the target conversion characteristic setters 14, 15 do not generate target conversion characteristic specification values corresponding to a characteristic number; instead, they generate a parameter (a value which represents a constant or the applicable range of an expression) defining a conversion characteristic, and thereby specify the conversion characteristic.

Second Embodiment

In the first embodiment, the video signal is a monochrome signal. When the video signal is a color signal, separate gray-scale conversion means may be provided for each component of the color signal and gray-scale conversion may be carried out each signal component separately.

Figure 11:
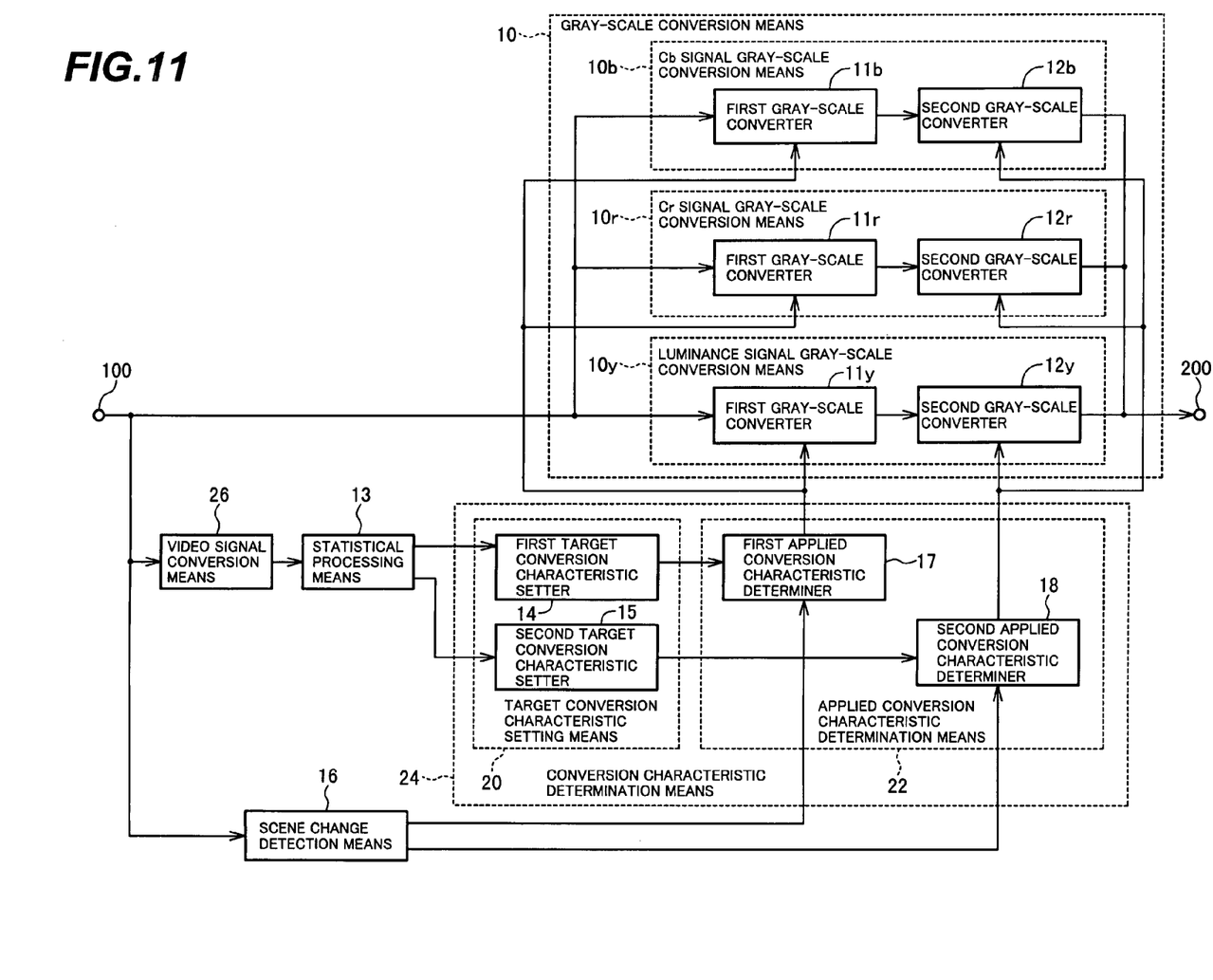
FIG. 11 is a block diagram illustrating a gray-scale improvement circuit in a second embodiment of the invention.

When the input video signal comprises a luminance signal and two color difference signals (Cr, Cb), the gray-scale improvement circuit is configured as shown, for example, in FIG. 11.

The gray-scale improvement circuit in FIG. 11 is similar to the circuit in FIG. 1 except for the following points. First, the gray-scale conversion means 10 in FIG. 11 has a luminance signal gray-scale conversion means 10y that converts the gray scale of the luminance signal, and color difference signal gray-scale conversion means 10r, 10b that convert the gray scale of the first and second color difference signals in the video signal.

The luminance signal gray-scale conversion means 10y includes a first gray-scale converter 11y and a second gray-scale converter 12y connected in cascade, similar to the first gray-scale converter 11 and second gray-scale converter 12 in FIG. 1.

The first color difference signal gray-scale conversion means 10r (the Cr signal gray-scale conversion means) includes a first gray-scale converter 11r and a second gray-scale converter 12r connected in cascade.

The second color difference signal gray-scale conversion means 10b (the Cb signal gray-scale conversion means) includes a first gray-scale converter 11b and a second gray-scale converter 12b connected in cascade.

Figure 12:
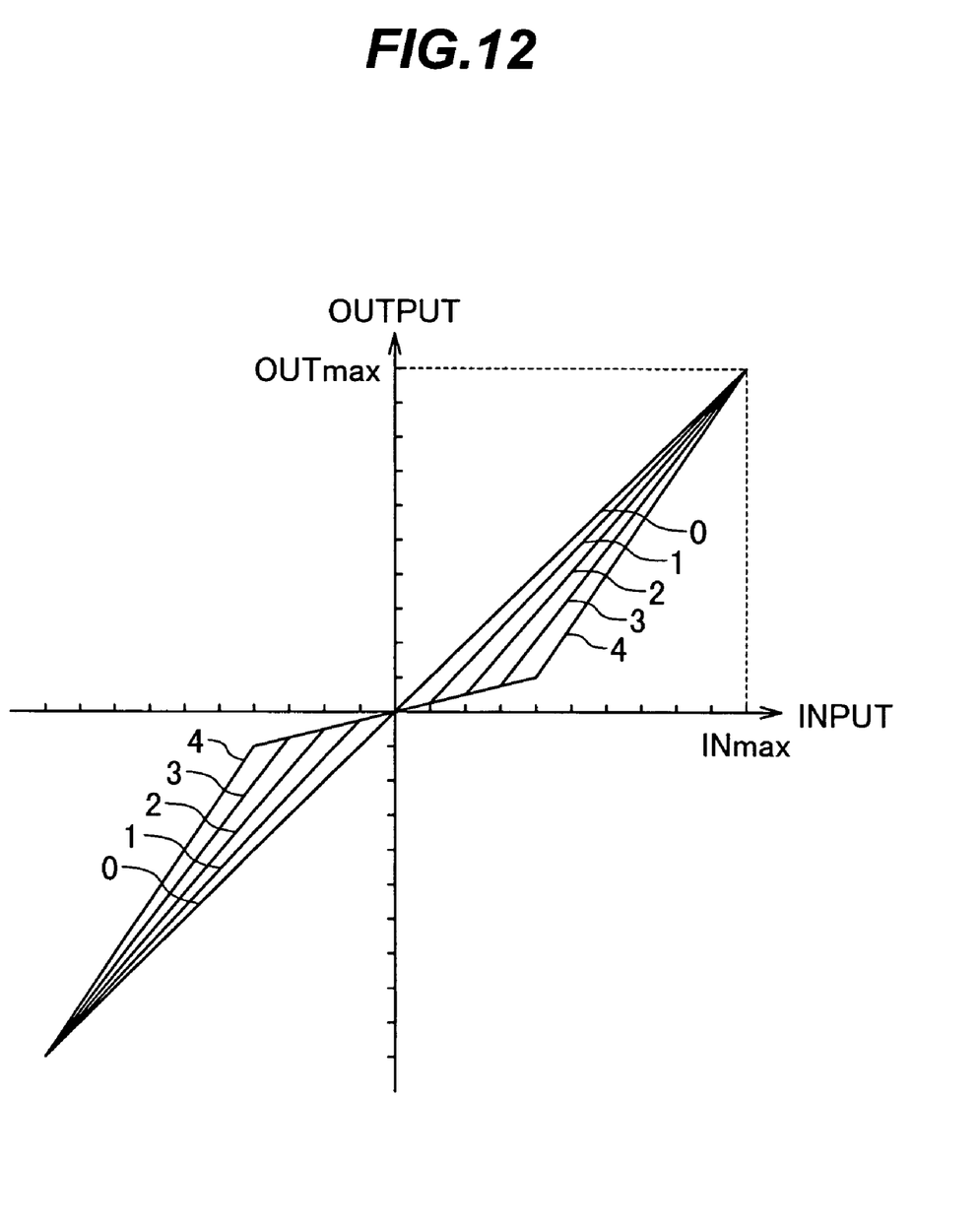
FIG. 12 is a graph showing conversion characteristics of the first gray-scale converter in the first color difference signal gray-scale conversion means in the second embodiment of the invention.

The conversion characteristics of the first gray-scale converter 11r in the Cr signal gray-scale conversion means 10r are shown in FIG. 12. As can be seen from this drawing, the color difference signal Cr takes on both positive and negative values, so the conversion characteristics of the first gray-scale converter 11r include a range in which the input is positive and a range in which the input is negative. The conversion characteristics in the positive range are similar to those of the first gray-scale converter 11y in the luminance signal gray-scale conversion means 10y. The conversion characteristics in the negative range are substantially point symmetric to the characteristics in the positive range with the origin as the center of symmetry.

The values of INmax and OUTmax in the positive range are half of the values for the luminance signal. If the luminance signal takes on values from 0 to 255, the first color difference signal Cr takes on values from −128 to 127. The parameters of the mathematical expressions representing the characteristics, in particular the parameters (kc1, kc2, kc3, kc4) corresponding to the intercept on the vertical axis or output axis, are changed proportionally.

The conversion characteristics of the first gray-scale converter 11b in the Cb signal gray-scale conversion means 10b are similar to the characteristics shown in FIG. 12.

Figure 13:
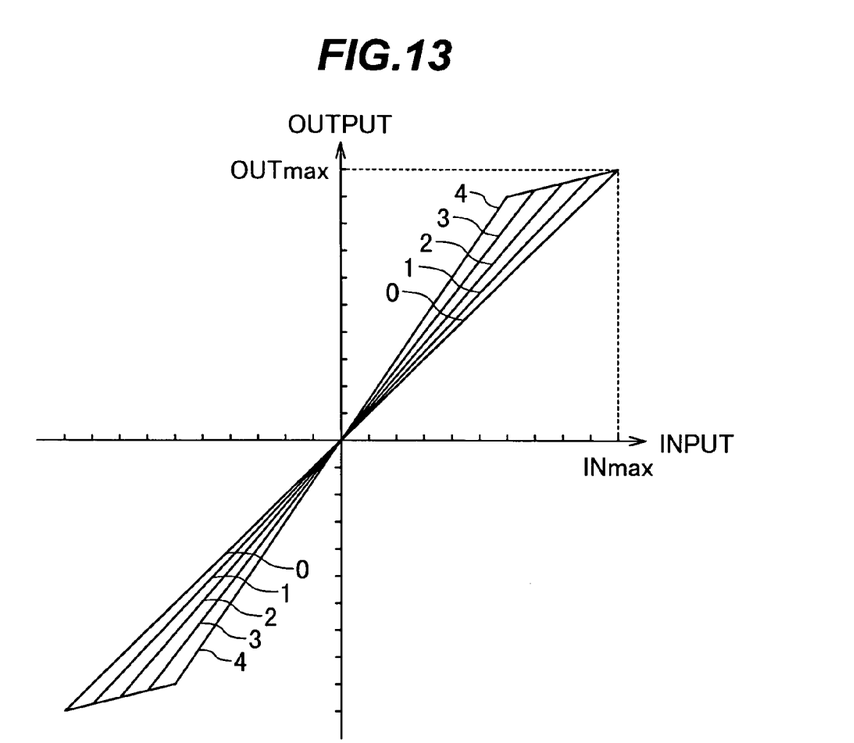
FIG. 13 is a graph showing conversion characteristics of the second gray-scale converter in the first color difference signal gray-scale conversion means in the second embodiment of the invention.

The conversion characteristics of the second gray-scale converter 12r in the Cr signal gray-scale conversion means 10r are shown in FIG. 13. As can be seen from this drawing, the color difference signal Cr takes on both positive and negative values, so the conversion characteristics of the second gray-scale converter 12r include a range in which the input is positive, and a range in which the input is negative. The conversion characteristics in the positive range are similar to those of the second gray-scale converter 12y in the luminance signal gray-scale conversion means 10y. The conversion characteristics in the negative range are substantially point symmetric to the characteristics in the positive range with the origin as the center of symmetry.

The values of INmax and OUTmax in the positive range are half of the values for the luminance signal. If the luminance signal takes on values from 0 to 255, the first color difference signal Cr takes on values from −128 to 127. The parameters of the mathematical expressions representing the characteristics, including in particular the parameter (kb) corresponding to the intercept on the vertical axis or output axis, are changed proportionally.

The conversion characteristics of the second gray-scale converter 12b in the Cb signal gray-scale conversion means 10b are similar to the characteristics shown in FIG. 13.

The first and second gray-scale conversion means in the luminance signal gray-scale conversion means 10y, the Cr signal gray-scale conversion means 10r, and the Cb signal gray-scale conversion means 10b are controlled by the output from the applied conversion characteristic determination means 22, and carry out gray-scale conversion using a conversion characteristic identified, for example, by a number equal to the specified value output from the applied conversion characteristic determination means 22.

Figure 14:
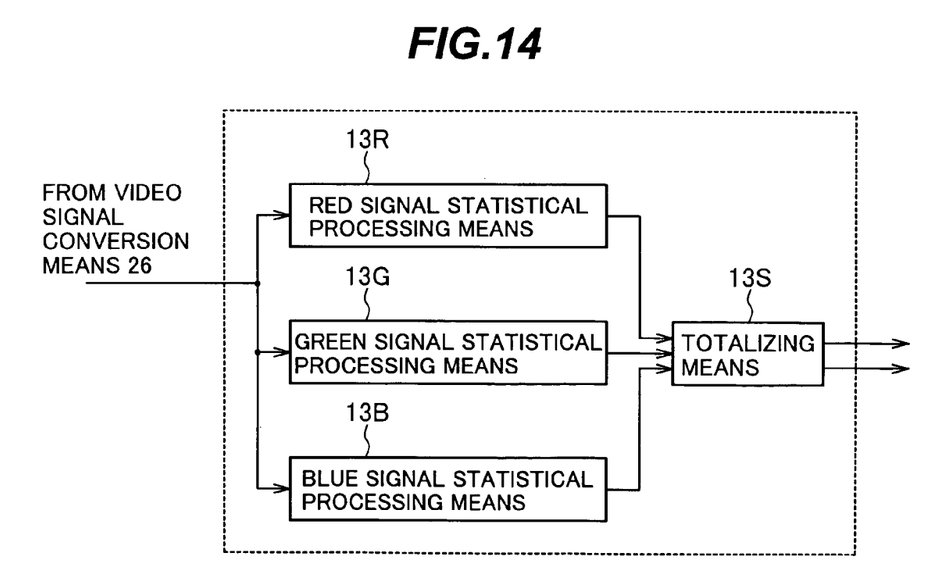
FIG. 14 is a block diagram showing details of the statistical processing means in the second embodiment of the invention.

The gray-scale improvement circuit in FIG. 11 includes a video signal conversion means 26 that converts the input video signal containing a luminance signal and color difference signals to red, blue, and green color signals. The statistical processing means 13 calculates histograms for the red, blue, and green color signals output from the video signal conversion means 26 as shown in FIG. 14.

More specifically, the statistical processing means 13 comprises a red signal statistical processing means 13R, a green signal statistical processing means 13G, and a blue signal statistical processing means 13B that calculate histograms for the red, green, and blue signals, respectively, and a totalizing means 13S that totals these statistical quantities. The totalizing means 13S carries out weighted addition of the statistical quantities from the red signal statistical processing means 13R, green signal statistical processing means 13G, and blue signal statistical processing means 13B to generate a final result (the result of statistical processing). In the weighted addition, the red and blue signals may be given smaller weights than the highly visible green signal.

Converting the input signal to red, green, and blue color signals before the statistical processing means 13 carries out statistical processing enables more accurate statistical quantities to be calculated (more accurately reflecting human perception).

Alternatively, the statistical processing can be performed on the luminance signal and color difference signals without converting them to red, green, and blue color signals.

Third Embodiment

In the second embodiment, the input video signal comprises a luminance signal (Y) and two color difference signals (Cr, Cb). If the input video signal includes red, green, and blue color signals, the gray-scale improvement circuit may be structured as in FIG. 15, for example.

Figure 15:
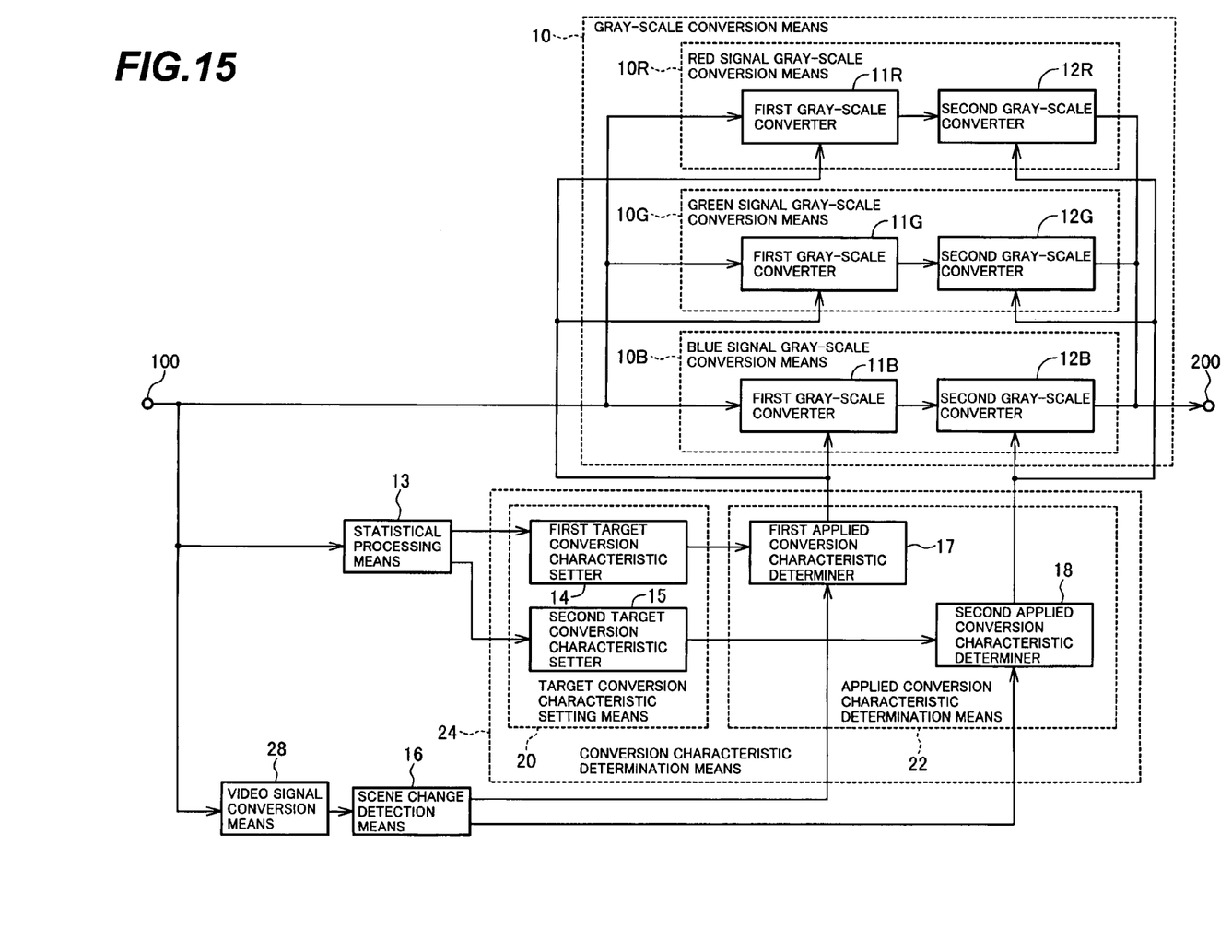
FIG. 15 is a block diagram illustrating a gray-scale improvement circuit in a third embodiment of the invention.

The gray-scale improvement circuit of FIG. 15 is similar to that in FIG. 1 except for the following points. First, the gray-scale conversion means 10 in FIG. 15 has a red signal gray-scale conversion means 10R which converts the gray scale of the red color signal in the video signal, a green signal gray-scale conversion means 10G which converts the gray scale of the green color signal, and a blue signal gray-scale conversion means 10B which converts the gray scale of the blue color signal.

The gray-scale conversion means 10R, 10G, 10B have respective first gray-scale converters 11R, 11G, 11B and second gray-scale converters 12R, 12G, 12B connected in cascade, similar to the first gray-scale converter 11 and second gray-scale converter 12 in FIG. 1.

The red signal gray-scale conversion means 10R, green signal gray-scale conversion means 10G, and blue signal gray-scale conversion means 10B are all similar and are controlled by the output from the applied conversion characteristic determination means 22 to carry out gray-scale conversion using a conversion characteristic identified by, for example, a number equal to the specified value output from the applied conversion characteristic determination means.

The gray-scale improvement circuit in FIG. 15 includes a video signal conversion means 28 that converts the input video signal comprising red, green, and blue color difference signals to a luminance signal; the scene change detection means 16 calculates statistics of the luminance signal output from the video signal conversion means 28.

In the first, second, and third embodiments described above, scene changes are detected between fields, but they may be detected between frames.

In the first embodiment, a field-to-field limit is placed on the control values in the gray-scale conversion means 11, 12 on the assumption that the input signal is for an interlaced video signal, but this is not a limitation; if the input signal is a progressive video signal, a frame-to-frame limit can be placed on the control values and scene changes can be detected between frames to achieve similar effects.

The gray-scale improvement circuits described in the above embodiments manipulate the gray-scale conversion characteristic according to a statistical property of the video signal and limit the amount of change in the gray-scale conversion characteristic from field to field or frame to frame, but relax this limit at scene changes. Thus, the circuit can follow changes in image content without delay, and an improved video signal always having high contrast can be obtained.

As described in the above embodiments, the scene change detection means comprises an areal mean value detection means that divides one screen into a plurality of areas and calculates a mean value for one field or one frame interval for each area. The number of areas in which the difference in the mean value between fields or frames is equal to or greater than a predetermined value is used as scene change information, enabling scene changes to be detected correctly with only a small amount of hardware.

Fourth Embodiment

Figure 16:
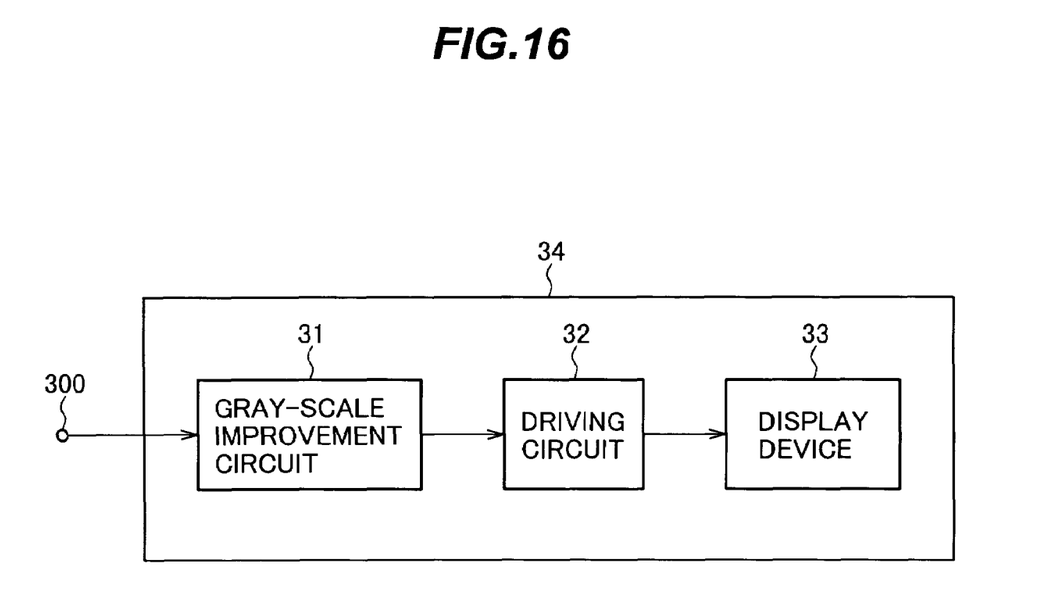
FIG. 16 is a diagram showing the structure of a display system in a fourth embodiment of the invention, incorporating a gray-scale improvement circuit.

A display system can be constructed by combining the gray-scale improvement circuit described in the first embodiment with a display means. FIG. 16 shows an example of this kind of display system.

The display system 34 shown in FIG. 16 comprises a gray-scale improvement circuit 31, a driving circuit 32, and a display device 33.

Any of circuits described in the first, second, and third embodiments above, for example, can be used for the gray-scale improvement circuit 31.

The driving circuit 32 drives the display device 33 according to the output from the gray-scale improvement circuit 31.

A video signal input at the input terminal 300 is input to the gray-scale improvement circuit 31, its gray scale is improved as described in the first, second, or third embodiment, and the improved video signal is input to the driving circuit 32. The driving circuit 32 converts it into a signal for driving the display device 33, and supplies the converted signal to the display device 33. The display device 33 displays an image responsive to the output of the driving circuit 32.

There is no particular restriction on the display device 33. Any display means can be used; examples include a liquid crystal panel, PDP (plasma display panel), DMD (digital micromirror device) panel, LCoS (Liquid Crystal on Silicon, a reflective liquid crystal panel), CRT (cathode ray tube), and FED (field emission display) panel.

As the display system comprises a gray-scale improvement circuit, an improved video signal always having high contrast is obtained.

What is claimed is:

1. A gray-scale improvement circuit, comprising:

a gray-scale conversion means for receiving an input video signal, converting its gray scale as necessary, and outputting the video signal with the converted gray scale;

a first video signal conversion means for converting the input video signal to red, green, and blue color signals when the input video signal includes a luminance signal and color difference signals;

a statistical processing means for detecting a statistical quantity in each field or each frame of the red, green, and blue color signals output by the first video signal conversion means when the input video signal includes said luminance signal and color difference signals, and for detecting a statistical quantity in each field or each frame of the input red, green, and blue color signals when the input video signal includes said red, green, and blue color signals;

a scene change detection means for detecting scene changes in the input video signal;

a target conversion characteristic setting means for using the output of the statistical processing means to set a target conversion characteristic as a target for the gray-scale conversion means; and an applied conversion characteristic determination means for determining a conversion characteristic for use for the video signal in the current field or frame from the target conversion characteristic set by the target conversion characteristic setting means, an output of the scene change detection means, and the conversion characteristic used for the video signal in the preceding field or frame; wherein the gray-scale conversion means converts the gray scale by using the conversion characteristic determined by the applied conversion characteristic determination means;

the conversion characteristic used by the gray-scale conversion means is a selected one of a plurality of conversion characteristics;

each of the plurality of conversion characteristics is identified by a characteristic number, the value of the characteristic number being associated with a feature of the conversion characteristic identified by the characteristic number, the feature gradually intensifying as the characteristic number increases;

the target conversion characteristic setting means and applied conversion characteristic determination means specify the conversion characteristics by specifying their characteristic numbers;

the applied conversion characteristic determination means limits the difference between the characteristic number identifying the conversion characteristic used for the preceding field or frame and the characteristic number identifying the target conversion characteristic set by the target conversion characteristic setting means for use in the current field or frame to within a prescribed limiting value; and the applied conversion characteristic determination means alters the prescribed limiting value according to the output of the scene change detection means.

2. The gray-scale improvement circuit of claim 1, wherein the input video signal includes said red, green, and blue color signals, further comprising:

a second video signal conversion means for converting the red, green, and blue color signals to a luminance signal;

wherein the scene change detection means detects said scene changes from the luminance signal obtained through conversion by the second video signal conversion means.

3. The gray-scale improvement circuit of claim 1, wherein the scene change detection means compares each field or frame of the input video signal with the preceding field or frame of the video signal, and outputs, as a scene change detection result, a signal obtained as a result of the comparison, indicating a degree of change of the video signal between fields or between frames.

4. The gray-scale improvement circuit of claim 1, wherein the scene change detection means:

separates one screen into a plurality of areas, and determines the mean value of a plurality of pixels in each of the plurality of areas in each field or frame of the video signal; and outputs the number of areas in which a difference between the mean value determined for each field or frame of the video signal and the mean value determined for the preceding field or frame of the video signal exceeds a prescribed value.

5. The gray-scale improvement circuit of claim 1, wherein the applied conversion characteristic determination means:

waives the limitation imposed by the limiting value when the number of areas output from the scene change detection means is equal to or greater than a first prescribed value;

sets the limiting value to a first value when the number of areas output from the scene change detection means is less than the first prescribed value and equal to or greater than a second prescribed value that is smaller than the first prescribed value; and sets the limiting value to a second value smaller than the first value when the number of areas output from the scene change detection means is less than the second prescribed value.

6. The gray-scale improvement circuit of claim 1, wherein the statistical processing means classifies input pixels in the video signal into a plurality of classes corresponding to their signal levels, and determines the occurrence frequency of pixels classified into each of the classes in each field or frame of the video signal.

7. The gray-scale improvement circuit of claim 1, wherein the statistical processing means determines the mean value of the pixels in each field or frame of the input video signal.

8. A display system comprising the gray-scale improvement circuit of claim 1, a display means, and a driving means for driving the display means according to the output of the gray-scale improvement circuit.

9. The gray-scale improvement circuit of claim 6, wherein the target conversion characteristic setting means determines a class at which a cumulative frequency obtained by sequentially summing occurrence frequencies in classes from a lowest gray-scale level upward becomes equal to or greater than a prescribed value and sets the target conversion characteristic according to the determined class.

10. The gray-scale improvement circuit of claim 6, wherein the target conversion characteristic setting means determines a class at which a cumulative frequency obtained by sequentially summing occurrence frequencies in classes from a highest gray-scale level downward becomes equal to or greater than a prescribed value and sets the target conversion characteristic according to the determined class.

* * * * *